United States Patent
Froessl

Patent Number: 6,023,528
Date of Patent: Feb. 8, 2000

[54] NON-EDIT MULTIPLE IMAGE FONT PROCESSING OF RECORDS

[76] Inventor: Horst Froessl, Gutenbergstrasse 2-4, 6944 Hemsback, Germany

[21] Appl. No.: 09/232,466

[22] Filed: Jan. 15, 1999

Related U.S. Application Data

[62] Division of application No. 08/162,367, Dec. 7, 1993, Pat. No. 5,875,263, which is a continuation of application No. 07/783,212, Oct. 28, 1991, abandoned.

[51] Int. Cl.[7] .................................... G06K 9/00
[52] U.S. Cl. ............................... 382/181
[53] Field of Search .................... 382/181, 229, 382/230, 231, 232, 309, 317, 135, 155, 276

[56] References Cited

U.S. PATENT DOCUMENTS

| | | | |
|---|---|---|---|
| 4,001,787 | 1/1977 | Kimmel | 340/172 |
| 4,009,467 | 2/1977 | Kodera et al. | 340/146.3 |
| 4,028,674 | 6/1977 | Chuang | 340/146 |
| 4,264,808 | 4/1981 | Owens et al. | 235/379 |
| 4,273,440 | 6/1981 | Froessl | 355/40 |
| 4,408,181 | 10/1983 | Nakayama | 382/317 |
| 4,553,261 | 11/1985 | Froessl | 382/309 |
| 4,574,395 | 3/1986 | Kato | 382/317 |
| 4,726,065 | 2/1988 | Froessl | 382/276 |
| 4,727,589 | 2/1988 | Hirose et al. | 382/232 |
| 4,742,556 | 5/1988 | Davis, Jr. et al. | 382/271 |
| 4,754,489 | 6/1988 | Bokser | 382/229 |
| 4,758,980 | 7/1988 | Tsunekawa et al. | 382/317 |
| 4,760,606 | 7/1988 | Lesnick et al. | 382/317 |
| 4,888,812 | 12/1989 | Dinan et al. | 382/135 |
| 4,944,022 | 7/1990 | Yasujima et al. | 382/155 |
| 4,985,863 | 1/1991 | Fujisawa et al. | 382/229 |
| 5,027,421 | 6/1991 | Kanno | 382/181 |
| 5,109,439 | 4/1992 | Froessl | 382/276 |
| 5,133,023 | 7/1992 | Bokser | 382/276 |
| 5,875,263 | 2/1999 | Froessl | 382/181 |

*Primary Examiner*—Jose L. Couso
*Attorney, Agent, or Firm*—Walter C. Farley

[57] ABSTRACT

A sequence of documents is delivered to an optical scanner in which each document is scanned to form a digital image representation of the content of the document. The image representation is automatically examined by data processing apparatus to select search words which meet predetermined criteria and by which the document can be subsequently located. The search words are stored in a non-volatile memory and the entire document content is stored in mass storage in image form. A font table is established and images of entered search words are constructed from the table. Unrecognized or imperfectly formed ambiguous characters are stored with the font table and are used in the construction of search words to eliminate text editing or are stored with converted characters of search words. The approach can also be used to eliminate editing of full text-converted data bases during input.

20 Claims, 5 Drawing Sheets

FONT TABLE

| FONTS → | 1 | 2 | 3 |
|---|---|---|---|
| CHARACTERS | | | |
| A | A | A | *A* |
| B | B | B | *B* |
| C | C | C | *C* |
| --- | --- | --- | --- |
| a | a | a | *a* |
| b | b | b | *b* |
| c | c | c | *c* |
| --- | --- | --- | --- |
| 1 | 1 | 1 | *1* |
| 2 | 2 | 2 | *2* |
| 3 | 3 | 3 | *3* |
| --- | --- | --- | --- |
| ! | ! | ! | */* |
| $ | $ | $ | *$* |
| --- | --- | --- | --- |
| Ambig. Char. | Ambig. Char. | Ambig. Char | Ambig. Char. |
| " | " | " | " |
| " | " | " | " |

NON-EDIT MULTIPLE IMAGE FONT PROCESSING OF RECORDS

CROSS-REFERENCE TO RELATED APPLICATION

This is a division of Ser. No. 08/162,367 filed Dec. 7, 1993, now U.S. Pat. No. 5,875,263, which is a continuation of Ser. No. 07/783,212 filed Oct. 28, 1991, now abandoned.

FIELD OF THE INVENTION

This invention relates to a system for the mass storage of documents and to a method for automatically processing documents for storage in such a way that the documents can be retrieved on the basis of the document content, the processing being accomplished with little or no human intervention.

BACKGROUND OF THE INVENTION

Various systems are used for the mass storage and retrieval of the contents of documents including systems such as those disclosed in my earlier U.S. Pat. Nos. 4,273,440; 4,553,261; and 4,276,065. While these systems are indeed quite usable and effective, they generally require considerable human intervention. Other systems involve storage techniques which do not use the available technology to its best advantage and which have serious disadvantages as to speed of operation and efficiency. In this context, the term "mass storage" is currently used to mean storage of very large quantities of data in the order of, e.g., multiple megabytes gigabytes or terabytes.

Storage media such as optical disks are suitable for such storage although light (holographic), magnetic and other media can be used.

Generally speaking, prior large-quantity storage systems employ one of the following approaches:

A. The content of each document is scanned by some form of optical device involving character recognition (generically, OCR) so that all or major parts of each document are converted into code (ASCII or the like) which code is then stored. Systems of this type allow full-text code searches to be conducted for words which appear in the documents. An advantage of this type of system is that indexing is not absolutely required because the full text of each document can be searched, allowing a document dealing with a specific topic or naming a specific person to be located without having to be concerned with whether the topic or person was named in the index. Such a system has the disadvantages that input tends to be rather slow because of the conversion time required and input also requires human supervision and editing, usually by a person who is trained at least enough to understand the content of the documents for error-checking purposes. Searching has also been slow if no index is established and, for that reason, indexing is often done. Also, the question of how to deal with non-word images (graphs, drawings, pictorial representations) must be dealt with in some way which differs from the techniques for handling text in many OCR conversion systems. Furthermore, such systems have no provision for offering for display to the user a list of relevant search words, should the user have need for such assistance.

B. The content of each document is scanned for the purpose of processing the images of the document content into a form which can be stored as images, i.e., without any attempt to recognize or convert the content into ASCII or other code. This type of system has the obvious advantage that graphical images and text are handled together in the same way. Also, the content can be displayed in the same form as the original document, allowing one to display and refer to a reasonably faithful reproduction of the original at any time. In addition, rather rapid processing of documents and storage of the contents is possible because no OCR conversion is needed and it is not necessary for a person to check to see that conversion was proper. The disadvantages of such a system are that some indexing technique must be used. While it would be theoretically possible to conduct a pattern search to locate a specific word "match" in the stored images of a large number of documents, success is not likely unless the "searched for" word is presented in a font or typeface very similar to that used in the original document. Since such systems have had no way of identifying which font might have been used in the original document, a pattern search has a low probability of success and could not be relied upon. Creating an index has traditionally been a rather time consuming, labor-intensive task. Also, image storage systems (i.e., storing by using bit-mapping or line art or using Bézier models) typically require much more memory than storing the equivalent text in code, perhaps 25 times as much.

Various image data banks have come into existence but acceptance at this time is very slow mainly due to input and retrieval problems. Because of the above difficulties, mass storage systems mainly have been restricted to archive or library uses wherein retrieval speed is of relatively little significance or wherein the necessary human involvement for extensive indexing can be cost justified. There are, however, other contexts in which mass storage could be employed as a component of a larger and different document handling system if the above disadvantages could be overcome.

In my copending applications Ser. No. 07/536,769 filed Jun. 12, 1990 and Ser. No. 07/547,190 filed Jul. 3, 1990, I have described techniques by which the input processing is accelerated and improved and in which the selection of search words is automated, i.e., performed with little human intervention. These systems allow the input of documents at a very high average rate of speed, requiring only about two seconds per document. Also, these systems provide techniques by which retrieval is facilitated because of the choice of search words usable to locate and identify stored documents at the time of retrieval. In part, the advantages of the systems are due to the use of font tables which allow searching for documents using pattern matching with search words constructed in the fonts or typefaces which are the same as those used in the original documents.

The above systems can employ some conversion of the words in the documents into code, such as ASCII, but an important aspect of them is that the documents are stored in image form regardless of how much is converted into code. In most cases, the amount to be converted is at least partly a matter of choice of the organization using the system. Nevertheless, whatever conversion is done has previously determined the amount of human assistance or intervention required because the major part of the human intervention is for the purpose of editing the converted text, i.e., making sure the conversion is correct or filling in characters which the conversion system (software or hardware) cannot recognize. Since human intervention must be done in most cases by someone who is reasonably well trained and able to understand the context and supply proper added information, the use of a person (or persons) is expensive, adding to the total cost of the system operation and to the individual cost of each document entered into image storage, a major cost item considering the millions of documents handled per company.

SUMMARY OF THE INVENTION

An object of the present invention is to provide an improved method of handling input documents, storing the contents of the documents and automatically creating a selection of search words in either code or image for the stored documents with little or no human intervention.

A further object is to provide a method of machine-indexing contents of documents which are to be stored in image form in such a way that the documents can be retrieved.

A still further object is to provide a document input processing and retrieval system which requires no editing of search words.

Another object is to provide such a system which processes incoming documents of any type quickly so that the content thereof is promptly available to the addressee and other authorized persons.

Briefly described, in one aspect, the invention comprises a method of retrievably storing contents of a plurality of documents having images imprinted thereon comprising optically scanning the documents to form a representation of the images on the documents and storing the image representation of each document, temporarily or permanently. A font table is established in image of characters in a plurality of different fonts each having a unique, identifiable location. Groups of characters are selectively recognized and converted into code for subsequent use as search words. When characters in the groups are not recognizable, they are treated as ambiguous characters and are stored with or in the font table in separate locations or within otherwise recognized search words. Searching for a document includes the steps of selecting and entering a search word, constructing an image of the search word from the font table in at least one font, and comparing the constructed search word with the image representations of scanned documents until a match is found or the documents have all been searched. Thereafter, images of the ambiguous characters are used as search words, or in search words, and the step of comparing is repeated.

In another aspect, the invention comprises a method of retrievably storing contents of a plurality of documents having images imprinted thereon comprising optically scanning the documents to form a representation of the images on the documents and storing the image representation of each document, temporarily or permanently. A font table is established in image of characters in a plurality of different fonts each having a unique, identifiable location. Groups of characters are selectively recognized for subsequent use as search words. When characters in the groups are imperfect, they are treated as ambiguous characters and are stored with or in the font table in separate locations. Searching for a document includes the steps of selecting and entering a search word, constructing an image of the search word from the font table in at least one font, and comparing the constructed search word with the image representations of scanned documents until a match is found or the documents have all been searched. Thereafter, images of the ambiguous characters are used as search words, or in search words, and the step of comparing is repeated.

The search words carrying the ambiguous characters may also be filed by sender font and date. In a further aspect of the invention without the font table approach discussed above, conventional OCR can use the non-edit approach for faster input.

In a still further aspect, the non-editing approach can be used with full-text converted data bases and the like.

In connection with the foregoing comment regarding the meaning of "mass storage", it must be recognized that the concepts of mass storage and, indeed, of memory and memory size in general, are constantly changing as the technology progresses. Thus, while the system of the present invention is regarded as being especially suited for large volume input and large volume storage at the present time, it is expected that it will be economically usable with somewhat smaller systems in the near future.

BRIEF DESCRIPTION OF THE DRAWINGS

In order to impart full understanding of the manner in which these and other objects are attained in accordance with the invention, particularly advantageous embodiments thereof will be described with reference to the accompanying drawings, which form part of this specification, and wherein.

DESCRIPTION OF THE PREFERRED EMBODIMENTS

Although the method and system of the present invention can be used to handle large data bases and in other applications, the invention will be described in the context of a system for handling incoming documents such as correspondence including letters, facsimile messages and the like in an organization such as a corporation or government agency which has various departments and employees and which receives hundreds or thousands of pieces of correspondence daily. At present, such mail is commonly handled manually. Either of two approaches is followed: in one approach, mail is distributed to departments, and perhaps even to individual addressees, before it is opened, to the extent that its addressee can be identified from the envelope; and in the other approach, the mail is opened in a central mail room and then distributed to the addressees. In either case, considerable delay exists before the mail reaches the intended recipient. In addition, there is very little control over the tasks which are to be performed in response to the mail because a piece of mail may go to an individual without his or her supervisor having any way to track the response. Copying (i.e., making a paper copy) of each piece of mail for the supervisor is, of course, unnecessarily wasteful. The present system can be used to store and distribute such incoming mail documents. Facsimile messages can similarly be handled and the system can be adapted to also handle E-mail (electronically transmitted and received mail) although this is not usually necessary because E-mail is normally directed to and received by an individual recipient at his or her computer or terminal and is thus already available to the addressee immediately.

Figure 1A:
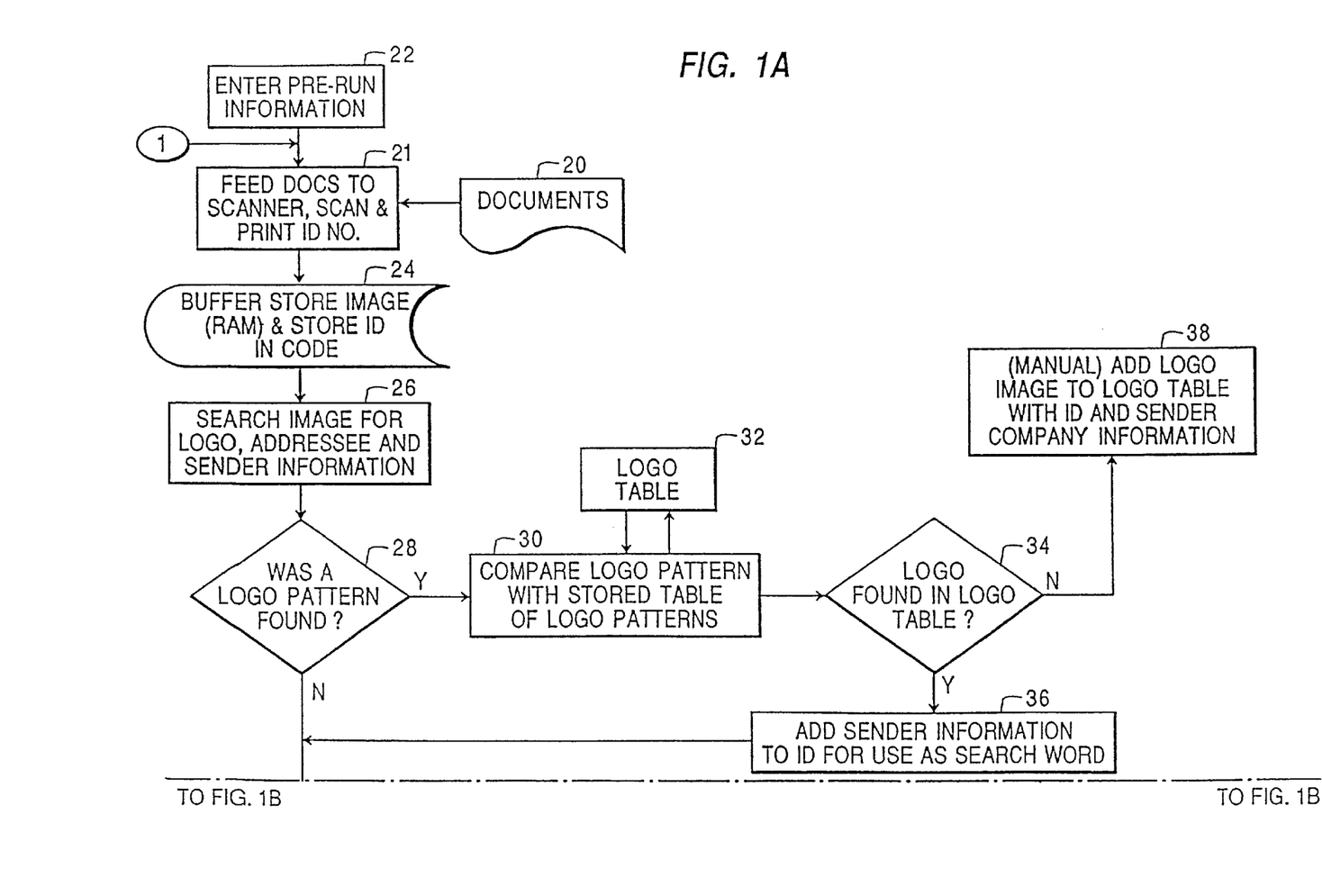
FIGS. 1A and 1B, taken together, show a flow diagram illustrating the method of the invention.

Referring first to FIG. 1A, at the beginning of the process of the present invention, each incoming document 20 is delivered 21 to a scanner and automatically can be given a distinctive identification (ID) number which can be used to identify the document in both the hard copy form and in storage. The ID number can be printed on the original of the document, in case it becomes necessary to refer to the original in the future.

The number is automatically provided by a time clock as each document is fed into the system. It is anticipated that most documents will be processed in a time of about two seconds or less each, which means that the time-based ID number will be unique for each document. As the number is being printed on the document, it is supplied to non-volatile storage, such as a hard disk, for cross reference use with other information about the document. Pre-run information 22 which may be useful to improve operation of the scanner can be supplied before the documents are fed.

In order for the processing to be reliable, there are certain prerequisites for the documents, systems and procedures to allow the documents to be processed. Most of these are commonto all conversion systems, not only those of the present invention. Currently available hardware devices are capable of performing these functions. The criteria are discussed in the above-identified applications and will not be repeated herein.

The documents are fed into the scanner, after or concurrently with assignment of the ID number (if an ID number is used), the scanner being of a type usable in optical character recognition (OCR). The system also includes the usual recognition hardware or software but it is used selectively, as will be described, and is preferably not part of the automatic operation of the scanner, although it could be. The scanner thus produces an output which is typically a sequence of electrical signals comprising a series of bits of data representing successive lines taken from the image on the document. Each of the successive lines consists of a sequence of light and dark portions which can be thought of as equivalent to pixels in a video display. Several of these "pixel lines" form a single line of typed or printed text on the document, the actual number of pixel lines needed or used to form a single line of text being a function of the resolution of the scanner, typically 300 to 400 dpi at the present time.

In conventional OCR, software is commonly used to analyze immediately the characteristics of each group of pixel lines making up a line of text in an effort to "recognize" the individual characters and, after recognition, to replace the text line with code, such as ASCII code, which is then stored or imported into a word processing program. In the first embodiment, recognition and conversion of the full text is not done at this stage and preferably is not done at all. Rather, the data referred to above as pixel lines is stored in that image form without conversion. Subsequently, search words are located and converted into code as described in the previously mentioned applications. The converted search words are stored in a readily accessible form of non-volatile memory such as a hard disk.

In this connection, memory such as random access memory, buffer storage and similar temporary forms of memory are referred to herein as either RAM or volatile memory and read/write memory such as hard disk, diskette, tape or other memory which can be relied upon to survive the deenergization of equipment is referred to as non-volatile memory. Other memory which is non-volatile but which would more often be used as archival or mass, permanent storage includes WORM, light (holographic) and very high density magnetic storage. Also, the term "character" is used to mean an alphanumeric character, a punctuation symbol or any form of special character which can be used in a document.

The pixel line image is stored in memory such as RAM 24 and the ID number, having been generated in a code such as ASCII by the time clock or the like concurrently with the printing, is stored in code form and correlated in any convenient fashion with its associated document image.

As will be recognized, the image which is stored in this fashion includes any graphical, non-text material imprinted on the document as well as unusually large letters or designs, in addition to the patterns of the text. Commonly, incoming correspondence will include a letterhead having a company logo or initials thereon. At this stage 26 of the process, the image can be searched to determine the addressee and also to determine if patterns indicative of a logo or other distinctive letterhead (generically referred to herein as a "logo") is present. This can be automatically performed by examining the top two to three inches of the document for characters which are larger than normal document fonts or have other distinctive characteristics. By "automatically" it is meant that the step can be performed by machine, i.e., by a suitably constructed and programmed computer of which examples are readily available in the marketplace. The term "automatically" is used herein to mean "without human intervention" in addition to meaning that the step referred to is done routinely.

If such a logo is found, 28, a comparison 30 can be made to see if the sender's company logo matches a known logo from previous correspondence. This information can be useful in subsequent retrieval. For this purpose, a data table 32 including stored patterns of known logos is maintained correlated with the identification of the sending organization and fonts used by that organization, the pattern information in the table 32 being in the same form as the signals produced by the scanner so that the scanner output can be compared with the table to see if a pattern match exists.

If the letterhead/logo on a document is recognized, 34, an identification of the sender, including address, is attached, 36, to the ID number for that particular document for subsequent use as a search word. If no pattern match is found, a flag can be attached to the ID number for that document to indicate that the logo has no identified addressee and the logo pattern is added, 38, to the existing table.

The ID number and any additional information which is generated by the computer system stored with that number, as well as search words to be described, are ultimately stored in code rather than image form. Such code is preferably stored on a hard disk while the images are ultimately stored in a mass store such a WORM (write once, read many times) optical disk. This allows the search words to be manipulated and modified. Meanwhile, all such data is held in RAM.

Figure 1B:
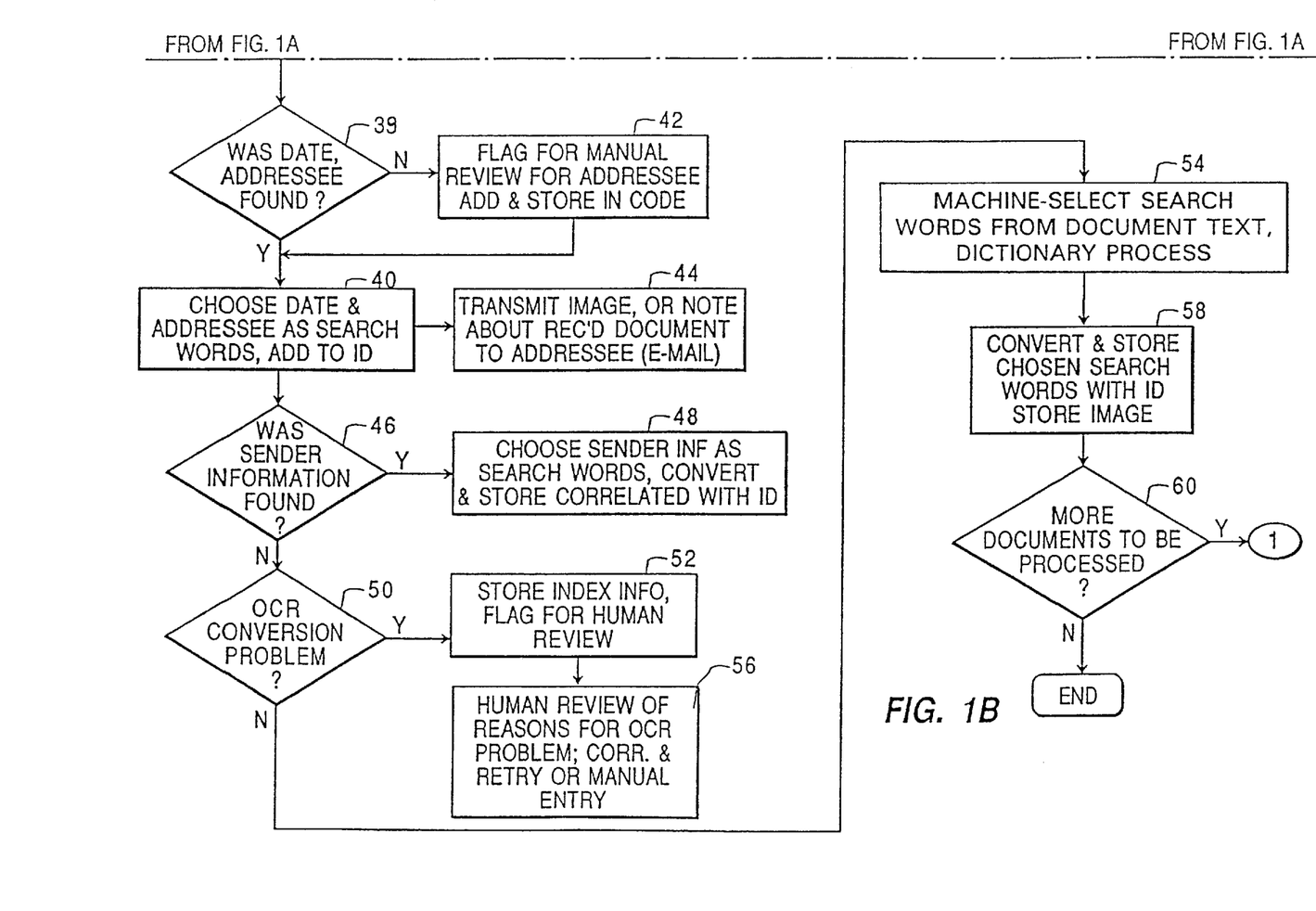

At this stage, continuing on to FIG. 1B, the system enters into a process of selecting search words and other information from the remaining parts of the document to allow immediate electronic distribution as well as permanent storage of the documents which have specifically designated addressees and to permit subsequent retrieval on the basis of information contained in the document. A general principle is to attempt to recognize portions of the document which are likely to contain information of significance to subsequent retrieval before the document is converted into code and to then convert into code only specific search words within those recognized portions.

It is customary in many countries to have the date of the letter and information about the addressee isolated at the top of a letter following a logo, or in a paragraph which is relatively isolated from the remainder of the text. This part of the letter easily can be recognized from the relative proportion of text space to blank space without first converting the text into code. A convenient technique for isolating and recognizing the date information is to maintain a table of date formats with various numerals therein and to compare character groups from the document with that table, either with or without conversion. Once recognized, 39, this portion can be converted, identified as "date" and "addressee" information 40 and stored with the document ID. When more than one address appears on the document, the date closest to the processing date is chosen. An image of the date chosen is then generated in all fonts and is so generated in new fonts coming in.

If no date or address is found, the record can be flagged, 42, for review so that the relevant information can be added manually.

At this stage of the process, normally about two seconds or less after the document has been introduced into the scanner, enough information will have been determined (in most cases) for the system to send to the individual addressee, as by a conventional E-mail technique, notification 44 that a document has been received, from whom, and that the text is available from mass storage under a certain ID number or search word and date. If desired, the image of the entire document can be transmitted to the addressee but a more efficient approach is to send only notification, allowing the intended recipient to access the image from mass storage.

If information identifying the sender is found, 46, that information is chosen as a search word or words, 48, stored and correlated with other information about the document. If not, a check is made, 50, to see if there are OCR conversion problems and, if so, the document information is stored and flagged for human review, 52, leading to analysis and correction of the problem, 56.

It is possible for the images of documents to be stored in succession without any conversion. Then, at a later time such as the end of the working day, all of the available data processing capability of the facility can be used for fast, parallel conversion and determination of search words, 54, based on dictionary comparison. This approach is suitable in an installation where the processing equipment used for the document handling is expected to also perform other computing functions for the company and it can also be employed, if necessary, to keep within the two-second processing time per document. Search words selected in step 54 are converted into code and stored, 58. The process reiterates 60 until all documents have been processed.

The present invention uses what will be referred to as a "font table", a similar form of which is also used in the system described in copending application Ser. No. 547,190, mentioned above. The font table in the present system is a matrix of patterns organized in such a way that the alphanumeric characters and other symbols in a specific style of font or typeface are correlated with specific locations or "slots" for those symbols. In the printing industry, typefaces are collections of characters and symbols that have a unique design or appearance while fonts are collections of characters and symbols (including punctuation and other special symbols) having not only a unique design but also a specific size. Thus, a typeface becomes a font when it is given a specific size. In the following discussion, the term "font" is used to generically include font and typeface and should be understood as meaning different styles or appearances of type as well as sizes of those various styles.

Figure 2:
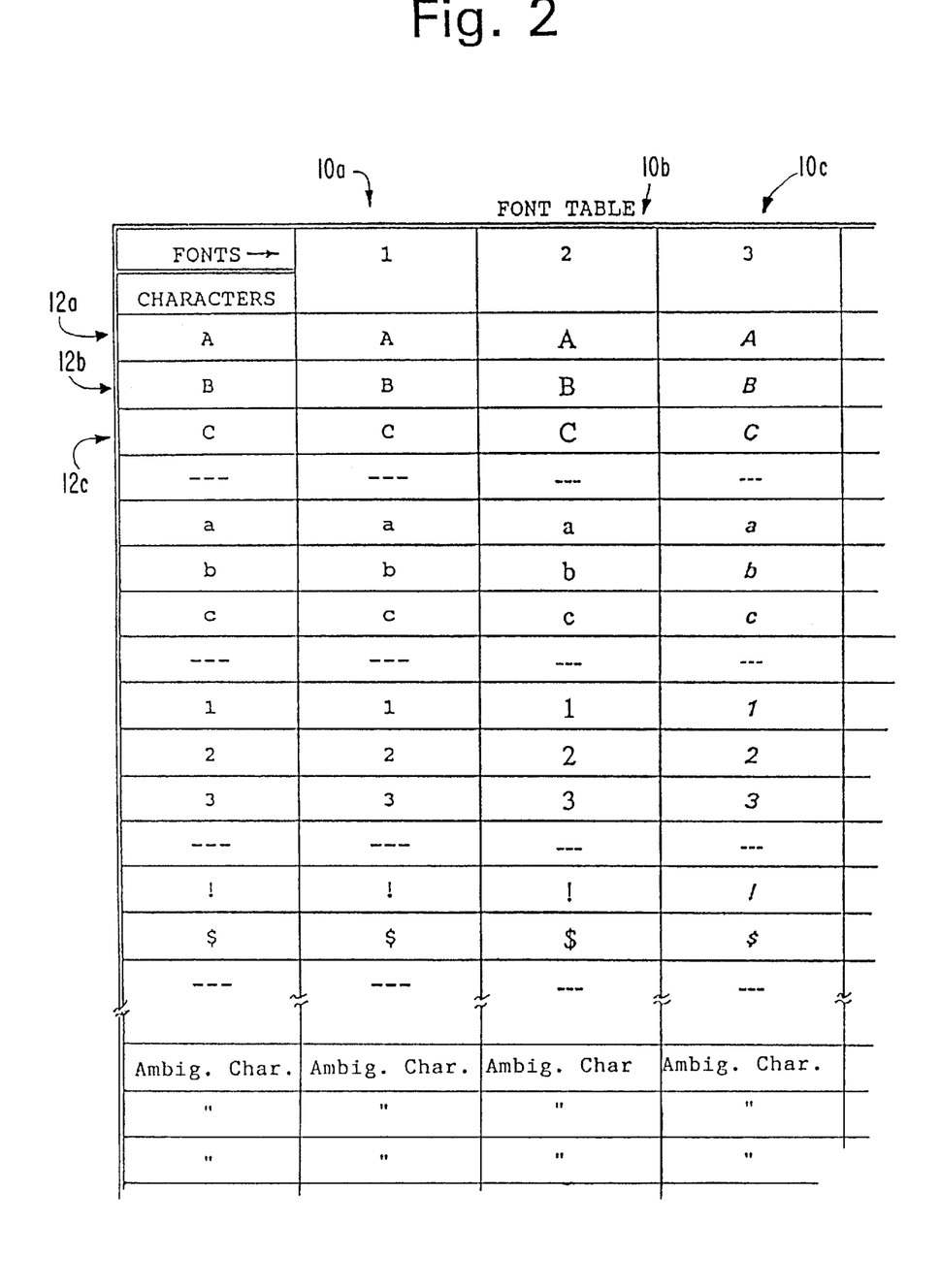
FIG. 2 is a representation of a font table of a type used in performing the method of the invention.

A schematic representation of a font table is shown in FIG. 2. The table can be represented on paper as having a plurality of columns 10a, 10b, 10c, . . . and a plurality of rows 12a, 12b, 12c, . . . . Each column contains a list of the various patterns of characters which go to make up a font set, each character being in the particular style of that font. Each row contains various forms of each character or symbol in each of the various fonts. At the intersection of a row and column is a slot at which will be found a specific character pattern in a selected font. The fonts can be identified in any convenient way, such as by numbers, and the individual characters are preferably identified by slot locations.

The present invention does not use a font table imprinted on paper but, rather, uses a table in the form of a non-volatile memory such as a hard disk, i.e., a memory medium which is not erased when power is removed. As such, it may not physically have columns and rows, but can have any convenient equivalent form of organization which has characteristics similar to the written form, such that a font set can be located and recognized, the members of a set of fonts representing any single character can be recognized and the slot locations can be quickly identified so that, e.g., the pattern which represents the letter "H" in font number 3 can be located at a specific slot in the memory. It will be noted that using the ASCII values to identify the letters in the font table is not desirable because there is no way of distinguishing between the various typefaces in which each letter can appear. Thus, a distinctive code identifying the slots themselves is to be used. The exact form of the code is, of course, not important so long as it is understandable to the data processing equipment.

The form of memory used is revisable, i.e., additions of new fonts can be made and corrections can also be made by, for example, replacing images in the table with images of other characters if it is found that an error has been made or a better example of a character image exists than the one originally stored in the table.

The font table thus described permits the following approach to be used:

1. Check each incoming document for its font and for a logo to see if they are recognized and, if not, to add them.

2. Select the date in image.

3. Select search words in image, e.g., run a comparison between the search words in image with a stored dictionary of words in image in the same font, the dictionary including either desired search words or unwanted search words so that each word in the text of the document can be either selected as a search word or excluded. Alternatively, the comparison can be done in code if conversion of text is employed.

4. Optionally, certain organization-specified search words can be selected in image.

5. Interconnect (i.e., correlate) the date, logo and search words selected.

6. Retrieval and display can then be accomplished by date, logo or by one or more of the search words.

As mentioned above, each member of each font set is stored in the table as an image. Thus, when one wishes to locate a specific word, printed in a specific font, in the mass store which contains all of the document text, the word is entered in code form as by keyboard and the character pattern, i.e., the image, equivalent to each letter of the word is copied from the font table into volatile memory (RAM) in the selected font. A pattern search is then conducted to find a string of patterns in the stored text which matches the string of patterns which has been constructed from the table. Searches can be performed in upper case, lower case or mixtures.

The dictionary mentioned above in connection with step 54 is a stored dictionary of words in image. The words can be words which should always be selected by the system as search words, particularly words which are of special interest to the organization using the system. In that case, the image of a word in a document which finds a counterpart in the dictionary will automatically be saved as a search word. Alternatively, the dictionary can be composed of words which should be rejected and not chosen as search words. A combination of the two can also be used.

The dictionary can initially be entered in code and then dictionaries in each of the fonts in the system can be generated from the code so that they will be available for comparison regardless of which font appears in the document under consideration. When a new font is recognized and added to the font table, the dictionary in that font is generated as soon as the slots for the new font in the font table are sufficiently filled.

A pattern search of the type described can be performed very quickly using a very fast computer search engine such as that developed and marketed by the Benson Computer Research Corporation, McLean, Va. The Benson systems employ multiple processors in a parallel architecture arrangement to conduct comparisons at a high rate of speed. Once located, the words or the documents which contain the word images can be copied into RAM or disk for display, sorting, printing or other manipulation. Alternatively, the contents of selected documents in mass storage such as optical disk (WORM) can be copied to RAM for pattern match searching.

It is also possible to automatically provide a string of all fonts in the table for each search word entered by a user for an individual search. However, for the most efficient searching, as suggested above, it is desirable to be able to specify the font or fonts in which the searched-for text appears, preferably by specifying the logo and therefore the company and its known fonts.

It is a relatively simple matter to maintain the font table. In received correspondence, the font (or fonts) used in a newly received letter is compared with the font table and, if the font is recognized as being in the table, the font is listed with the name of the sender. If a font is not recognized, the document image can be flagged to bring it to the attention of an operator for addition to the table, generally a partly manual process. This can be performed by character recognition and slot assignment or by manually assigning characters to slots by an operator, especially if the font is an old or outdated kind of text (e.g., old English or German styles) which would require at least a manual check. If the character recognition technique is used, recognition after a minimum number of tries is given the highest confidence; a large number of tries at recognizing a character may mean that the character is difficult for the system to recognize in that font.

Of particular importance to the present invention is the situation in which unrecognized characters are present. In the embodiment in which each search word chosen from the text is converted into code as described above, there will be some characters which will not be recognized in many of the search words. This can be because the specific machine which produced the document blurred certain characters or because of folds, marks added to the document, etc. The presence of these unrecognized characters has, in the past, been responsible for a large amount of the manual editing required. The present system does away with this need.

A character which is not recognized by the OCR system is referred to in this embodiment as an "ambiguous character". An ambiguous character can be a letter, a number or a special symbol such as a punctuation mark or the like. Whatever the ambiguous character might be, its image, or the image of the entire character group containing the ambiguous character, is stored in association with the font table but in a slot section reserved for such characters. If the font of the remainder of the document is known, the ambiguous character can be stored in association with that font, i.e., in the portion of the memory equivalent to the same "column", using the analogy to the written table.

Storing the entire character group (word) which contains the ambiguous character uses more memory but has the advantage of keeping the image of the ambiguous character in context with the other characters of the group which were recognized by the OCR software or hardware. Thus, storing entire words or other character groups containing ambiguous characters is the preferred technique. The ambiguous character or word can be correlated with a date on which it was received and a logo for use in guiding or limiting subsequent searching. Thus, when the search criteria include an instruction to search for a document received between two dates, the system will use only ambiguous characters or words which are from documents received between the specified dates.

With this information it is possible when entering documents into the system to save the ambiguous characters of the words in image, storing them in an "ambiguous character" slot in the font table with the date and logo associated with the character. When one wishes to retrieve a document, a search word is entered by the operator. From the image file of search words created when the documents were entered into the system, images of all search words similar to the entered one are displayed adjacent the search word entered by the operator. It is possible for one or more of the image search words to have ambiguous characters. If they do, and if the operator decides that it is desirable to save those ambiguous characters for future searches, the character is highlighted and saved in a "back-up" slot. If, for example, the ambiguous character is an "f", there would be two fs, the one originally saved in the font table in the f slot and the back-up. Subsequently, it would be possible, if desired, to eliminate all ambiguous characters of a certain type by running a special routine for that purpose.

The organization of the font table can be thought of as, for each font, characters arranged in an order such as the following:

Upper case letters
Lower case letters
Numerals
Special characters, including punctuation marks
Ambiguous characters.

Although this specific order need not be adhered to, it is important for the characters in each font to be in the same order as each other font, whatever that order might be.

It is also possible because of the correlation with the logo to automatically correct incoming ambiguous characters of fonts, based on a previous correction when the document was retrieved. Assume, for example, that several documents from one source identified by a certain logo are processed and stored and that in some or all of those documents an "a" is considered ambiguous. During the initial processing, the ambiguous "a" is stored as an ambiguous character in one of the ambiguous character slots. Then, sometime later, one of those documents is retrieved using a search word which is constructed using the ambiguous "a" and the user recognizes that it is an "a". By confirming to the system that the ambiguous character should be treated as an "a", the user (if he or she is authorized to do so) can initiate a routine to save the "a" in the backup slot as described above and then to correct all future documents received from that same source so that that character is treated as an "a". A file can be established to save a certain number of these corrections in the event of an erroneous correction so that they can be checked for some interval of time.

Also, depending upon the desires of the organization using the system, it is possible to establish an upper limit to the number of ambiguous characters in a group which will be handled in the above automatic fashion. Above that limit, the group will be flagged for human attention or an error message can be displayed. The limit can be established on the basis of an absolute number of characters or a percentage so that, for example, four ambiguous characters in a six-letter word would cause the word to be flagged but four ambiguous characters in a ten-letter word would not. An upper limit can also be established for an entire document since an unusually large number of unrecognized characters may indicate a problem with the recognition and conversion system or a document which is simply beyond its capabilities.

Using the techniques discussed above, search words are identified and, in accordance with the invention, the images of those search words can be stored in a separate search word table or index. That table or index can be displayed and words selected therefrom for search purposes. Pattern match searching from this table has a very high probability of success, without reference to the font table, because the search is beginning with an image derived directly from the document being searched for.

Thereafter, when a system user wishes to retrieve a document dealing with a specific subject and expected to have therein a certain word, or group of words, the words are entered by keyboard and search words are constructed from the available fonts in the system table. If the desired document exists in storage in the system, its font will be in the font table because, as described above, every font of the stored documents is added to the table at the time the document is input if it was not already there. Any searching aids which can be used, such as the sending company identification to narrow the selection of fonts or dates to limit the amount of material to be searched, is entered in the system with the search words.

A pattern search is then conducted through the stored material and if the search words are matched, the desired document can be retrieved and displayed on the screen of any monitor in the system. Whether or not the pattern search is successful, however, it is possible that one or more of the words in the stored images of the documents which should match the search word images do not match because the stored words contain characters which were not recognizable, i.e., which were ambiguous characters. In this event, the stored words containing ambiguous characters are automatically used as substitutes in the search words for various characters and the search is repeated. Ambiguous characters can also be stored individually by date in the appropriate slot, as discussed above, permitting complementing correct characters. Either approach drastically increases the probability of locating a match because the image being used as the searching tool is an image taken directly from the stored documents so that the desired document can almost certainly be retrieved. It will be noted that no human editing has taken place during the document input process, nor is any necessary.

However, now that the document has been retrieved it is possible for the user to recognize what the ambiguous character was supposed to have been and for the system to make the correction automatically since the search word entered by the operator provides the basis for automatic corrections with, of course, approval by the operator. Storing that correction along with, or correlated with, the ambiguous character then allows the system to automatically correct that ambiguous character in this instance and the next time it is encountered in a retrieved document or in a new, incoming document. Thus, the system has a limited "learning" capability. This represents a new philosophy in data storage and retrieval because it includes not only a new approach to searching but also includes automatic editing during the search word display phase requiring essentially no additional human effort. On the other hand, human intervention beyond that required is not precluded, depending on the desires of the using organization.

To summarize, in my earlier systems an unsuccessful attempt at conversion of a search word or any other word is handled by flagging the word for human review. While this is workable, it is possible to reduce the amount of human involvement in the editing process still further by using the following approach.

1. The incoming documents are entered and scanned as discussed above.

2. The program identifies the font, as before.

3. Search words are selected and the search words (or the entire text) are converted into code.

4. Any words which contain individual characters which cannot be converted, i.e., which are not positively recognized by the OCR software and are therefore ambiguous characters, are stored in image. The locations where such words are stored is separately stored in conjunction with the document or the ambiguous characters alone are stored separately in conjunction with date and logo. Running the words against the dictionary in image may also result in finding ambiguous characters.

Note that no human intervention is required, even when the program encounters the ambiguous characters, in the input processing of the incoming documents.

Later when it is desired to retrieve documents stored with the above technique, an approach somewhat similar to that described earlier is followed, but with some important differences.

5. One or more search words, typically several, are chosen and entered in the computer to locate a document and a search is conducted.

6. Thereafter, that search word is replaced by search words containing ambiguous characters and the search is repeated. Since the search is conducted using images of the character groups directly from the stored documents, the probability of finding a match is close to 1. Note that the ambiguous character search is preferably conducted whether or not the initial search is successful. This is done because, although the initial search may have found some "hits", it is possible for there to be additional words not found because they contained ambiguous characters.

It is important to recognize the distinction between using a search technique which allows less than 100% accuracy to be considered a "hit" and the ambiguous character approach of the present invention. If a system allows, for example, 70% accuracy to be considered a hit, then the system will call up documents having words which are not at all relevant to the search words entered into the system but are sufficiently close to satisfy the 70% system requirement. A ten-letter word can have three wrong letters and still be considered a hit. This is roughly equivalent to running a search for a ten-letter word with three "wild card" letters and in which the wild card letters can be any three of the ten. Thus, such a system is likely to tell the user that there are many more documents of interest than there actually are, and each of those documents must then be reviewed to determine relevance.

The system of the present invention, however, does not produce that kind of error because the search is not conducted with "wild card" characters at all; rather, the search is conducted with images of words taken directly from the documents in storage which have characters considered ambiguous only because the recognition and conversion part of the system could not recognize those specific characters therein. With this approach, if a match is found, the probability of the match being correct is very close to 100%. The number of documents is then a function of how many documents in the data base contain the word or words used as search words and also meet other criteria set for the search such as date ranges, company names, etc.

It should be recognized that in any system which uses document scanning input and conversion of search words, selected by any technique, the selected search words in code are saved and correlated with the document or documents from which they came, such as by an ID number, as well as with the location in image storage of the search word image, whether or not any of the search words contain one or more ambiguous characters. Then, during a search, if all of the converted characters of a search word correspond to letters in the user-entered search word, the ambiguous characters in the search word will be ignored for purposes of selecting the search word.

The search word can then be displayed and the operator can retrieve the image counterpart of the search word for display with the converted SW. The image is correlated with a particular document, so the operator can display, together with the search word image, words to the left and right of the search word, or even words from lines above and below the line containing the search word so that the search word with its ambiguous character can be viewed in context. In the code form, the SW is preferably displayed with the ambiguous character highlighted as, for example, by a blinking cursor, or replaced entirely by a blinking blank. Alternatively, the ambiguous character (or ambiguous characters) can be displayed in image within the display of the remainder of the SW in code, preferably made more evident by a reverse video technique or the like.

The ambiguous character can then be corrected by the user entering the proper character or by approval of the viewed as being the proper one corresponding to the search word which was entered. The corrected search word is then stored and can be used for automatic correction of similar search words received in the future or similar words in text already processed but not retrieved or reviewed by a user.

EXAMPLE

1. A search word "p*tent" is located and stored, the "*" representing an ambiguous character. In image, the word "patent" appears but it is not clear whether the second character is an "a" or an "o".

2. The search word is stored in image, correlated with the document, by ID or other information, and the location in the document. The converted SW is also stored with the ambiguous character being represented by either the image pattern for the ambiguous character or by a special symbol.

3. Later, when a search is being conducted, the user enters the word "potent" by keyboard. The image words "p*tent" and "potent" are retrieved from the search word list. Since the user cannot be sure whether "*" should be an a or an o in that particular search word (i.e., in the document from which it came), the neighboring words are retrieved and it is clear from the context that the unclear word should be "patent". Since the image word differs from the entered search word, the user strikes "a" and confirms that the ambiguous character is that letter. The ambiguous character now can be stored as an alternative "a" in the font table and can be used for other, automatic, corrections.

As mentioned above, the above described system is particularly useful for data bases in which all of the data is converted into code.

The foregoing has assumed that some conversion of characters to code would take place, at least for the search words. However, in another aspect of the present invention, it is possible to use a technique which requires no conversion at all, although conversion is not precluded if it is desired for special purposes.

Some human intervention is required in this approach in order to construct and maintain the font table, but the amount of human intervention for this purpose is considerably less than in an editing capacity and the need for intervention decreases as the system is used more and more. Many of the techniques used in the foregoing embodiment are applicable to this embodiment as will be recognized from the following discussion which focusses on the differences between them.

As before, the incoming documents are scanned and the images are stored. Search words are selected, using techniques discussed earlier. For purposes of the present description, it will be assumed that a font table has been constructed using several common fonts before commencing use of the system, although it is possible to use the following techniques beginning with an empty font table and building it totally from input documents. Characters of the search words are compared with fonts in the font table, if one exists, to see if the font is recognized. If not, it is necessary to identify each different character and assign it a proper position in the font table. This requires human viewing of the document in image, highlighting or otherwise selecting each new character and pressing a key or two to indicate the slot to which that character should be assigned, using a general table order similar to that mentioned above.

It is likely that one incoming document with a new font will not contain all letters of the alphabet in upper and lower case and all of the numerals, etc., so it will not be possible to build a complete table of the new font in one try. However, as each new document with that font is received, the table will be made more complete until finally it is filled with perhaps all except some special characters. The program can record the dates and number of human interventions and after some selected number of times can display a message on the screen indicating that the operator should make a final check because it appears that no further human intervention is necessary. If the final check indicates that a few characters are still missing, a form questionnaire can be sent to the source of the font asking that samples of these characters be provided. This can also be done immediately after a new font is detected as having been used.

The above approach will result in fewer ambiguous characters than in the case of conversion because the human eye is more likely to be able to recognize characters which are smudged, on folds of a page or otherwise imperfect than is character recognition equipment. However, it is important for the operator to save those characters which present an unclear appearance as ambiguous characters, even though they might be recognizable, because characters which are altered by unusual circumstances (such as the page fold) will be more easily matched if the image thereof is used for the search than if an image of the same character but in perfect form is used for the search. Thus, the operator must be alert for such characters to save them as ambiguous characters in the same manner as described above in connection with the conversion techniques.

In this embodiment, as with those discussed earlier, establishment of a logo table and correlation of logos with sender identities, dates and specific fonts from those senders is important. Human assistance is very likely to be necessary to make the initial correlation of a logo with a sender but, as the system is used with more and more documents from the same correspondents, the need for adding new logos would be expected to decrease and the need for human involvement would also decrease.

Once again, it will be seen that the system undergoes a form of "learning process", with human help, and becomes more able to operate alone as time passes and as the system is used more.

After the search words are selected by techniques discussed in my earlier copending applications, it is desirable to form lists of search words from which an operator can select. The lists can be organized in any convenient way, such as by the addressee or the department of the addressee within the using company, by subject matter, or by date as well as by date within any of the other categories, to facilitate location and selection of a search word or group thereof likely to find the desired document(s). It is also possible to construct search words, somewhat as described above, by entering a search word with a keyboard so that the program can construct the word from the relevant font or fonts in the font table. It is important for the users of the system to be able to add and delete search words when that appears desirable.

Figure 3:
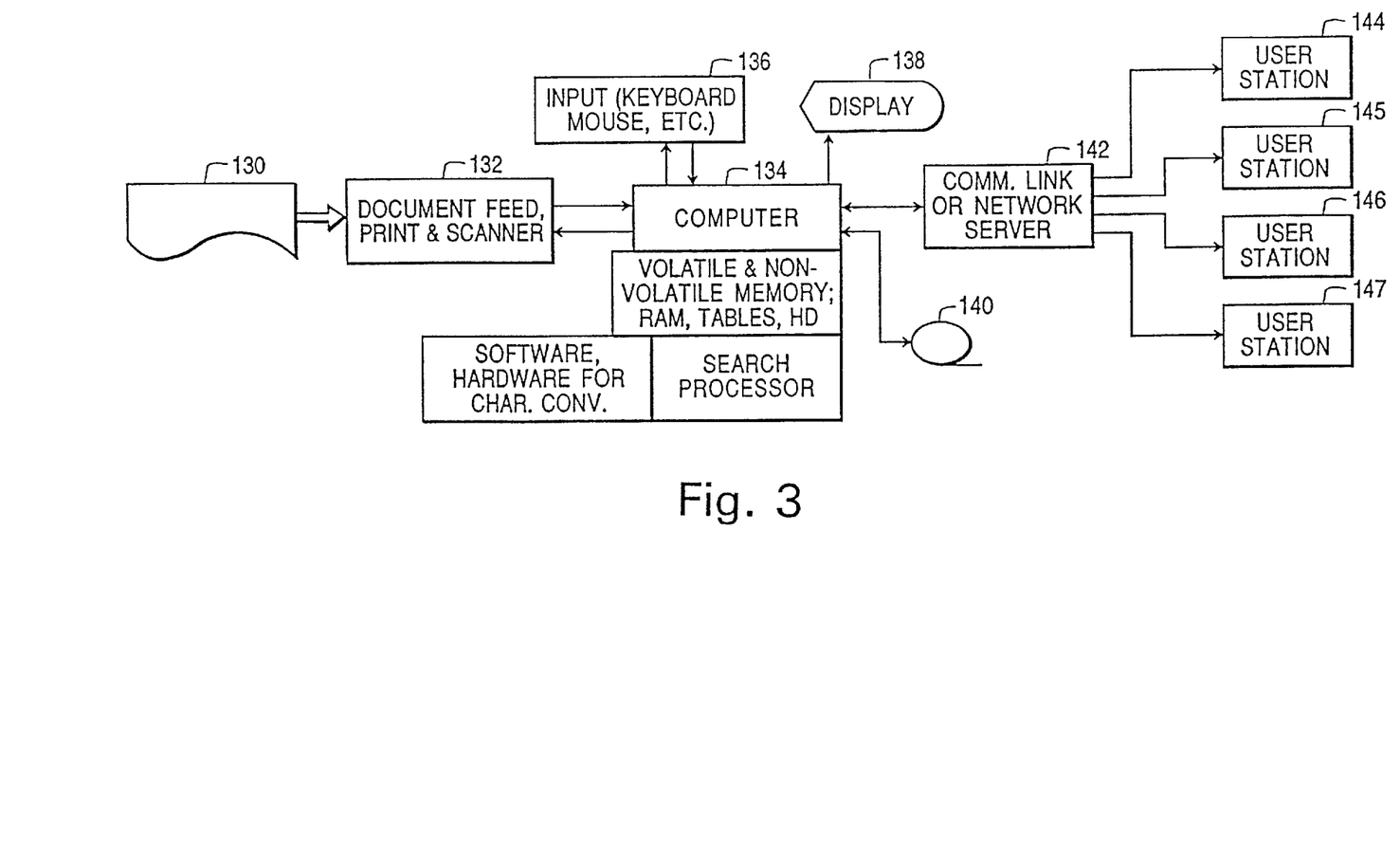
FIG. 3 is a schematic block diagram of a system usable to perform the method of the invention.

FIG. 3 shows a rather simplified diagram of a system in accordance with the present invention. It will be recognized by those skilled in the art from the above description that the most important aspects of the present invention reside in the software and the system configuration rather than in hardware since each piece of hardware is individually available and is capable of performing the necessary steps of the method without modification. However, in order to be sure that the actual configuration is clear, the system is shown in block form in FIG. 3.

Documents 130 are delivered to a scanner 132 which can be accompanied by a time-clock printer to provide unique document identification, as described above, and has a document feeder. Scanner 132 provides the scan data to a computer 134 which is the "heart" of the system in the sense of controlling the sequence of events and the communication between various components. As such, it is provided with volatile and non-volatile memory of adequate capacity to allow the necessary processing, hold the programs and store the tables which are used in connection with the present invention. In addition, the computer 134 has, either as an integral part or as a cooperating processor which could be a separate computer, the necessary hardware and software for character conversion as well as a search engine such as the Benson parallel processor mentioned above. The computer also has the customary keyboard or other input device 136 and a display 138.

Computer 134 is provided with a bidirectional communication bus for data transfer to and from mass storage equipment 140, such as a "juke box" CD-ROM drive for data retrieval which may be part of, or in addition to, apparatus for storing newly processed data on the mass storage media.

A network server or other form of communications link 142 provides bidirectional communication between computer 134 and a plurality of user stations represented by stations 144–147 which constitute the apparatus of the addressees in the foregoing discussion. Normally, each such station will have a terminal or a personal computer giving access to the system, including memory to which messages can be delivered. Through link 142, the user stations can receive information about documents processed and stored by the system and can obtain access to any of the data stored in mass store 140 as well as the search information, including lists of search words and the like, discussed above.

In view of the extensive discussion of the method of the invention above, it does not appear to be necessary to further discuss the operation of the system of FIG. 3.

Figure 4:
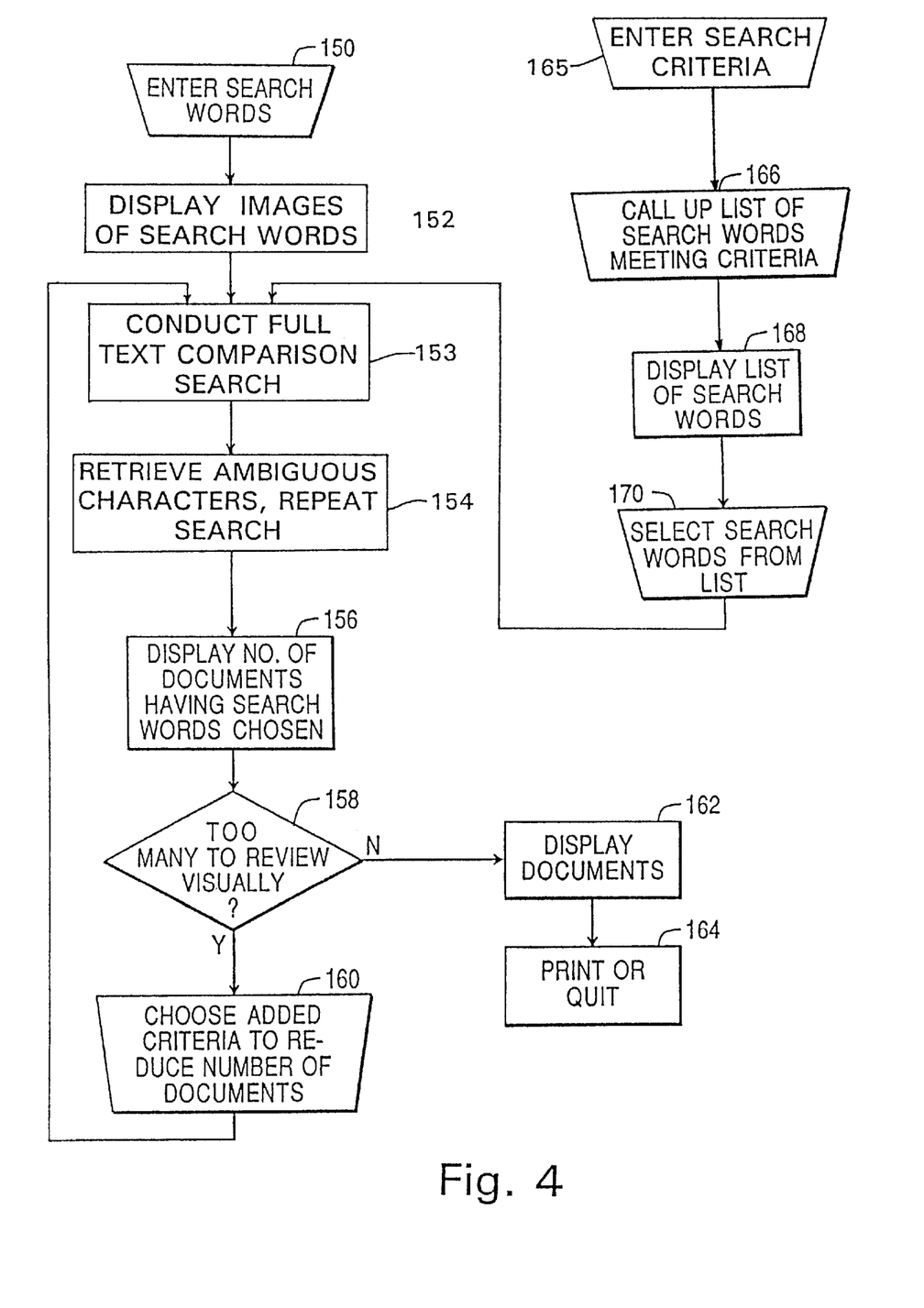
FIG. 4 is a flow diagram of a search technique in accordance with the invention.

FIG. 4 shows a typical approach for retrieving one or more documents which have been stored in accordance with the present invention. Much of the retrieval technique will be apparent from the above description and there are several variations which will not be described at this stage. However, there are two general approaches which can be used to start the search which will be mentioned.

It will be apparent from the above that the purpose of extracting and storing the search words is to provide an efficient "handle" by which the documents can be found again. Thus, to begin a search, one can enter into the computer 136 and one or more search words, 150, optionally with other search criteria such as a company identification or a time interval to be investigated. The search word or words entered can simply be recalled from the memory of the person doing the searching, as will frequently be the case. For example, if a person at station 146 is seeking a letter about a matter relating to a rear axle, he or she might enter the words "rear axle" as the search words.

The image of each search word entered is retrieved or constructed in the appropriate font and displayed, 152. Correction of the image can be done at this time. The image(s) are then used to make a comparison search, 153, through the stored documents and all matches or "hits" are recorded. As discussed above, ambiguous characters can then be retrieved and the search repeated, 154, to be sure that all potential matches are found. It will be recognized that these two search steps need not be separate; they are simply mentioned separately for clarity.

Preferably, the system then displays, 156, at the user station the number of documents found with the search word or combination of words. The number may be too large for expeditious review, 158, in which case the user can elect, 160, to restrict the search, e.g., to letters only from the Volkswagen company, whereupon the comparison is made again. When the number of documents is reduced to one or to a reasonable number for review, the documents can be displayed and visually reviewed, 162, until the desired one is located. The user can then choose to have the document printed or can simply learn the needed information from the display or perform whatever is necessary to suit the purpose of the search and quit, 164.

As an alternative way of commencing the search, the user can enter a set of search criteria, 165, and call up, 166, from the search word store a list of words meeting the criteria such as words from documents sent from a specific company or received during a specified interval of time. The list is displayed, 168, and the user can then select search words from the list, 170, and then initiate the search. This approach has the advantage that the user can be sure that there will be some hits since the words in the search word list are all taken from actual documents stored.

If the search would have been unsuccessful with the search word entered only because of the presence in the document of an ambiguous character, the use of ambiguous characters in the search word as described above essentially guarantees success.

While certain advantageous embodiments have been chosen to illustrate the invention, it will be understood by those skilled in the art that various modifications can be made therein without departing from the scope of the invention as defined by the appended claims.

What is claimed is:

1. A method of inputting and preparing data from source documents for storage and subsequent retrieval comprising the steps of scanning each source document and forming signals representative of digitized patterns derived from images of characters and graphics thereon, storing the signals representative of the digitized patterns, selecting segments of the stored signals for further processing, converting signals representative of digitized patterns of characters into a machine code, storing as ambiguous characters the digitized patterns of each character not successfully converted into machine code including storing as ambiguous words each group of characters which includes converted characters and at least one ambiguous character, and storing the digitized patterns of the selected segments correlated with the machine code for subsequent use.

2. A method according to claim 1 and including displaying groups of characters which include converted characters and at least one ambiguous character, and manually identifying the ambiguous character.

3. A method according to claim 1 and further including preparing for a search by displaying a selected group of converted characters to be used as a search word, concurrently displaying the image of the group from which the characters were converted, and conducting the search with the image.

4. A method according to claim 1 and including, if the selected group includes an ambiguous character which is recognizable on the display, manually correcting the ambiguous character by keying in the correct character.

5. A method according to claim 4 and including, if the selected group includes an ambiguous character and is the same word as the keyed-in word, approving the displayed word and thereby correcting the converted group.

6. A method according to claim 4 and including, if the selected group includes an ambiguous character which is not recognizable on the display, additionally displaying words adjacent to the displayed word from the image of the document from which the word with the ambiguous character was selected.

7. A method according to claim 4 and including displaying an ambiguous character in a distinctive display from the converted characters.

8. A method according to claim 4 and including displaying the group of characters with recognized characters displayed from code and ambiguous characters displayed in image.

9. A method according to claim 3 and including automatically machine-selecting search words from each document to be used in locating the document from mass storage.

10. A method according to claim 9 and including correlating each search word with a date indicative of an interval of time during which the document from which the search word was selected was sent and received.

11. A method according to claim 9 and further comprising forming a logo table of stored patterns of images of logo designs identifying sending organizations together with information in code form about the sender employing each such design, when a document having a design is scanned, conducting a pattern search of the stored patterns of images in the logo table to seek a match between the scanned design and a stored image, when a pattern match is found, retrieving and correlating with the identification of the document the identifying organization information associated with the matched pattern from the logo table, and when a match is not found, flagging the document for addition of the design and identifying company information to the logo table.

12. A method according to claim 3 which includes selecting patterns of images of ambiguous characters for use as search word images.

13. A method according to claim 12 and including combining recognized characters with ambiguous characters to form search words.

14. A method according to claim 13 and including selecting a search word by keying in a word, displaying a stored image of a selected group of characters of a similar word and, if the selected group includes an ambiguous character and is the same word as the keyed in word, approving the displayed word and thereby correcting the ambiguous character in the converted group.

15. A method according to claim 3 wherein the step of storing patterns of images of ambiguous characters includes storing the pattern of the image of each group of characters containing an ambiguous character.

16. A method according to claim 3 and further comprising establishing a font table in memory including patterns of images of characters in a plurality of different fonts, each character of each font having a unique, identifiable location in a memory area, and comparing characters of an incoming document with the patterns of images in the font table and, if a matching font is not found, adding patterns of images of the characters of the incoming document to the font table.

17. A method according to claim 16 and including determining an identity for the sender of each document scanned, and correlating the identity with specific fonts used by the sender.

18. A method according to claim 16 and further including establishing a dictionary of search words in image for each font in the font table, and wherein the step of selectively recognizing and converting groups of characters includes comparing groups of characters in each scanned document with the dictionary to determine which words should be converted into code, and storing converted words as search words.

19. A method according to claim 18 wherein the dictionary includes words which are to be selected as search words.

20. A method according to claim 18 wherein the dictionary includes words which are not to be selected as search words.

* * * * *